Jan. 23, 1968  R. A. DELANEY ET AL  3,365,631
SEMICONDUCTOR-FERROELECTRIC DIELECTRICS
Filed July 14, 1965  3 Sheets-Sheet 2

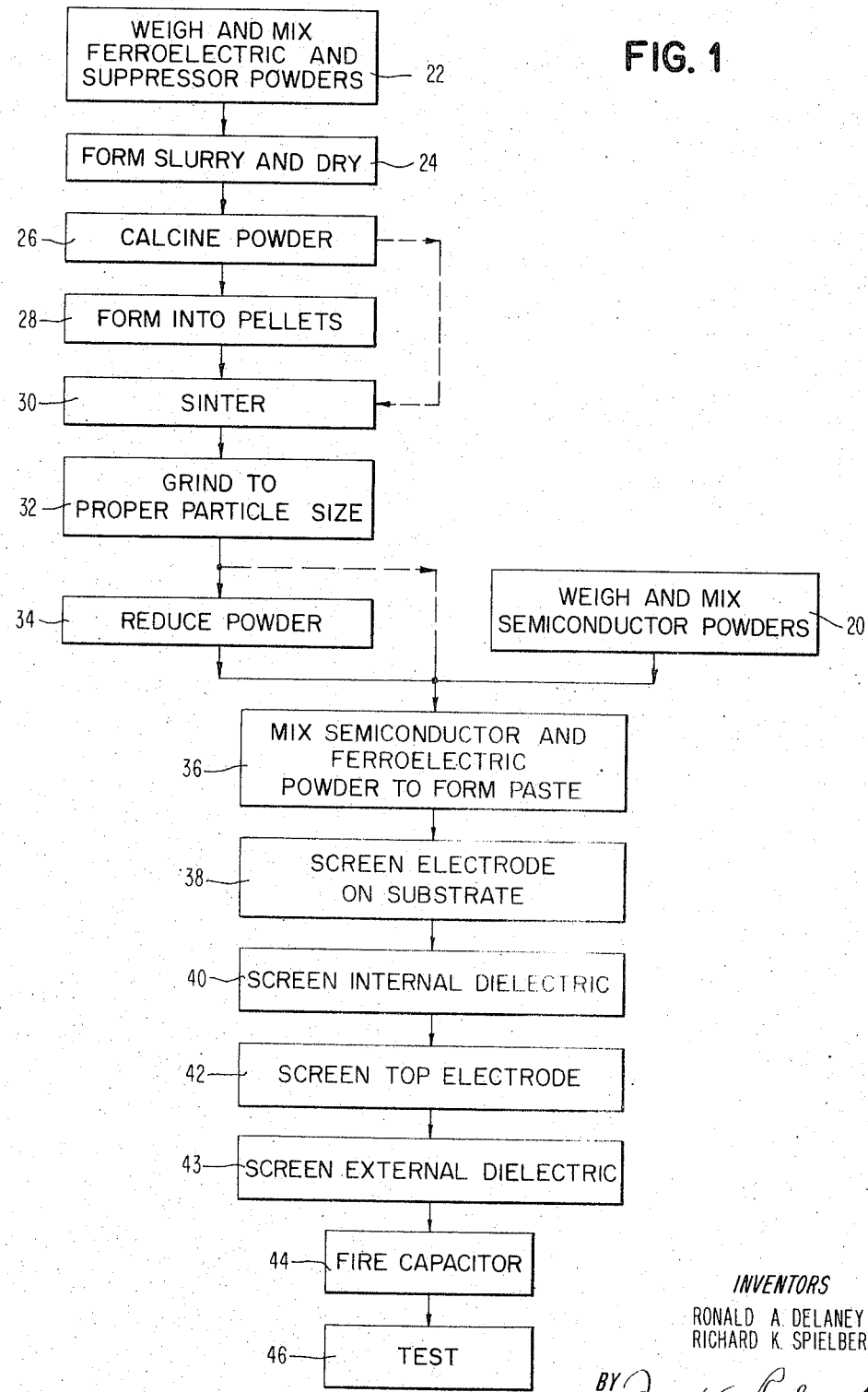

FIG.3

| EXAMPLE | % ZnO Bi₂O₃ CuTiO₃ | %BaTiO₃ BiSnO₃ | Ke x100 DIELECTRIC CONSTANT | RESISTIVITY ρ(Ω-CM)10⁷ AT 1 VOLT D.C. | DAMPING α(%) |
|---|---|---|---|---|---|
| 1 | 100 | 0 | 10 | 5 | >98 |
| 2 | 90 | 10 | 11.5 | 200 | >98 |
| 3 | 80 | 20 | 12 | 300 | >98 |
| 4 | 70 | 30 | 11.5 | 400 | >98 |
| 5 | 30 | 70 | 4 | 1000 | 80 |
| 6 | 20 | 80 | 4.5 | 1000 | 70 |
| 7 | 10 | 90 | 5 | 1000 | 60 |
| 8 | 0 | 100 | 6 | 1000 | <50 |

FIG.2

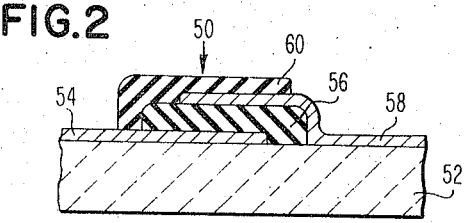

FIG.4

| EXAMPLE | SEMICONDUCTOR % BY WT 96%ZnO+3%Bi₂O₃ +1%CuTiO₃ | FERROELECTRIC (SUPPRESSOR) % BY WT 87%BaTiO₃+13%SnO₃ | RESISTIVITY (ρ) IN (Ω-CM)10⁷ AT 1 VOLT D.C. | CHARACTERISTIC IMPEDANCE (1Z1) IN Ω BETWEEN 10 TO 1000 Mcps | DIELECTRIC CONSTANT (Ke) AT 5 Mcps | DAMPING COEF. (α) IN % AT 5Mcps |
|---|---|---|---|---|---|---|
| 9 | NONE | 100% RED. Bi₂(SnO₃)₃ | 1000 | NOT CONSTANT | 800-1000 | 20% |
| 10 | 100% | NONE | 5 | 2-3 | 900-1100 | 98% |
| 11 | 80% | 20% RED. CuSnO₃ | 15 | 2-3 | 1600-1800 | 98% |
| 12 | 80% | 20% REG. CuSnO₃ | 40 | 2-3 | 1200-1400 | 98% |
| 13 | 80% | 20% RED. Bi₂(SnO₃)₃ | 400 | 4-5 | 1100-1300 | 98% |
| 14 | 80% | 20% REG. Bi₂(SnO₃)₃ | 200 | 4-5 | 1000-1200 | 98% |
| 15 | 80% | 20% RED. PbSnO₃ | 50 | 2-3 | 1500-1700 | 98% |
| 16 | 80% | 20% REG. PbSnO₃ | 5 | 2-3 | 1400-1600 | 98% |

United States Patent Office 3,365,631
Patented Jan. 23, 1968

3,365,631
SEMICONDUCTOR-FERROELECTRIC
DIELECTRICS
Ronald A. Delaney, Wappingers Falls, and Richard K. Spielberger, Hopewell Junction, N.Y., assignors to International Business Machines Corporation, New York, N.Y., a corporation of New York
Filed July 14, 1965, Ser. No. 471,810
12 Claims. (Cl. 317—258)

This invention relates to dielectric materials. More particularly, the invention relates to dielectrics useful in reactive circuit elements and methods of fabrication.

Microelectronic circuits, currently popular for information handling systems, are fabricated on small modules, one half inch by one half inch. These circuits have high switching speeds and are usually characterized by a low impedance which must be matched by low impedances in adjacent parts of the circuit. To apply appropriate voltage biases to a circuit module, a common power supply is coupled through the module to ground or to some other voltage source to provide the required low impedance. However, a power supply and ground are usually, electrically, some distance from the module. Therefore, the modules often suffer the loss of their low impedance in the power supply ground circuit because of the inductances of the conductor lead to the respective modules.

Also, low impedance circuits, typically tunnel diodes, with very fast switching times can give rise to severe noise transients in the power supply circuit. The noise transients lead to spurious signals which cause unwanted switching in different portions of the circuit located on the same module.

Both of the foregoing difficulties can be resolved by coupling the power supply circuit to ground with a suitable charge reservoir, i.e., a decoupling capacitor which lowers the effective power supply impedance. Large decoupling capacitors are desirable, but the area usually available on modules is quite limited. More seriously, the decoupling capacitor, module lead inductance and power supply impedance form an inductive loop which tends to oscillate after a switching pause. This oscillation or "ringing" can also lead to circuit malfunctions. The usual solution is to introduce resistive loss into the circuit. However, as the resistive loss is placed in series with the capacitor, damping is achieved only at the expense of the low transit impedance of the capacitor. If the resistor is placed in parallel with the capacitor, excessive DC power dissipation in the resistor brings about a rise in module temperature as well as a waste of power.

A previously filed application, IBM Docket 14,076, Ser. No. 360,323, filed Apr. 16, 1964, assigned to the same assignee as that of the present invention, describes an improved dielectric which when employed in a capacitor, minimizes the loss of low impedance in a power supply circuit to ground. An improved dielectric described in a previously filed application, IBM Docket 14,156, Ser. No. 465,329, filed June 21, 1965, now U.S. Patent No. 3,264,537, issued Aug. 2, 1966 and assigned to the same assignee as that of the present invention, provides decoupling capacitors with a higher damping characteristic at higher switching frequencies in addition to a higher DC resistance than the corresponding decoupling capacitor described in the application Ser. No. 360,323. The particular materials identified in these copending applications include the combination of, by weight, at least 94% of an N-type semiconductor material and not more than 6% of a P-type semiconductor material.

The present invention is a further improvement on the previously filed applications. The present invention provides a dielectric which permits capacitors to have a higher DC resistance than that previously described. Further, the dielectric constant is improved. These features permit the present dielectric to be used in microminiaturized capacitors operated at higher voltages than those described in the previously filed applications.

Generally, ferroelectric materials, as for example barium titanate, strontium titanate and the like, have a relatively high resistivity and a high dielectric constant, particularly in the neighborhood of their ferroelectric curie temperatures. However, in addition to the hysteresis effect, from which such ferroelectric materials obtain their name, these materials are also characterized by piezoelectric effects, and more importantly, the dielectric constants of such materials are noticeably temperature dependent. Semiconductor materials, in contrast, as for example zinc oxide, have relatively low resistivity and a low dielectric constant as compared to the ferroelectric material.

Combinations of ferroelectric and semiconductor materials would appear to result in increased resistivity without adversely affecting dielectric constant. Normally, the combination of dielectrics follows a logarithmic mixing rule or Lichtenecker's rule (see A. von Hippel, Dielectric & Waves, John Wiley & Sons, 1952, p. 231). As a high dielectric is diluted with a lower dielectric, the higher deelectric constant goes down with the dilution. The combined dielectric constant should be less than that of the highest in the composition. Also, the dielectric constant will be temperature sensitive. The resistivity of the semiconductor-ferroelectric system, however, would appear to be sufficient to permit capacitors of higher voltage rating. The proper materials and quantities for a combined semiconductor-ferroelectric system, which is substantially temperature insensitive and of adequate dielectric constant for a microminiaturized capacitor would greatly aid microelectronic circuits.

A general object of the invention is a dielectric having a controlled DC resistivity and dielectric constant.

One object is a semiconductor-ferroelectric dielectric suitable for microminiaturized capacitors.

Another object is a semiconductor-ferroelectric dielectric which is substantially temperature insensitive.

Another object is a semiconductor-ferroelectric composition including a suppressor to control selectively dielectric constant and resistivity.

Still another object is a screenable semiconductor-ferroelectric dielectric which has a higher dielectric constant than that of the screenable semiconductor or the ferroelectric.

These and other objects and features are accomplished in accordance with the present invention, one illustrative embodiment of which comprises a mixture of a semiconductor, ferroelectric and suppressor as a dielectric for a reactive circuit element, typically a decoupling capacitor, employed in a microlectronic circuit. The dielectric, preferably, comprises approximately 80% semiconductor and 20% ferroelectric modified by suppressor to flatten the curie point of the ferroelectric.

In one form, the semiconductor comprises 97% zinc oxide and 3% bismuth trioxide, all percentages being by weight. The ferroelectric comprises 87% by weight barium titanate, the remainder being a suppressor, typically a metal stannate. In another form the semiconductor may be doped with an appropriate impurity as described in Ser. No. 465,329, now U.S. Patent No. 3,264,537. A typical method of preparation was as follows:

A selected amount of ferroelectric, typically reagent grade barium titanate and a metal stannate, as for example lead stannate, is weighed and dry-mixed for two hours in a motor-driven agate mortar and pestle. Sufficient distilled water is added to make a thin slurry which is dried to form a powder residue. The residue is calcined at 1000° C. for two hours on zirconia plates. The calcine is crushed (and can be pressed into pellets under 20,000 p.s.i.). The pellets are sintered at 1425° C. for two hours on a zirconia plate. The sintered material is crushed and blended into a trichloroethylene or tetrachloroethylene slurry which is ground in a ball mill until an agglomerate of particle size ≤ 0.8 mil is reached as determined by a standard grind gauge. The sintered powder is dried to drive off the solvent and, if desired, reduced in a forming gas atmosphere at 900° C. for one hour.

A semiconductor, typically a zinc oxide and bismuth oxide composition, is prepared by weighing of the appropriate quantities and mixing the dehydrated powder in a motor-driven agate mortar and pestle. The mixture is mixed for two hours, after which it is combined with the barium titanate and a metal stannate. The zinc oxide and bismuth trioxide composition represents 80% by weight of the compound. The barium titanate and stannate represent 20% by weight of the compound. A transfer vehicle typcially beta-terpineol plus ethyl cellulose (30% by weight of the final mixture) is added to raise the viscosity to the proper level for further treatment in a three roll mill. The resultant paste may be fired into a suitable dielectric useful in a reactive circuit element, typically a decoupling capacitor, for a microelectronic circuit.

Capacitors, employing the previously described dielectric, are fabricated on a 96% alumina substrate. In a typical case, the area of the capacitor plates is 0.01 square inch. The bottom plate and associated lead are silk screened using a suitable conductive paste. A gold-platinum paste is illustrative of a plate material. The substrate and screened conductor are fired at 800° C. for 30 minutes to burn off the organic vehicle and fuse the plate or electrode to the substrate. One or more layers of dielectric are screened using a 325 mesh stainless steel screen. The first layer is fired at 1000° C. for 10 to 15 minutes and quenched before the second layer is screened. After a drying at 150° C. for 15 to 20 minutes, a top plate of the same conductive paste is screened over the dielectric and this in turn is dried. The composite structure is fired for a desired time and temperature. The substrate is quenched by removing the unit from the furnace at the temperature and placing under a stream of coolant gas. Electrical connections are made with copper pins placed through holes in the substrate. The connections are subsequently soldered to the conductive leads on the capacitor.

One feature of the invention is a semiconductor dielectric modified by a selected quantity and type of ferroelectric to increase resistivity and the dielectric constant thereof.

Another feature is a semiconductor-ferroelectric dielectric including means for rendering the ferroelectric substantially temperature insensitive.

Another fetaure is a zinc oxide semiconductor modified by a barium titanate metal stannate ferroelectric, the composition having a range of parts by weight which provides dielectric constants of the order of 1100–1800; resistivity of the order of $10^{10}\Omega$-cm. at 1 v./cc. and damping coefficients of the order of 80% to greater than 98%.

Another feature is a combined 70–90 semiconductor, 30–10 ferro electric-metal stannate composition which has a higher dielectric than that of the individual elements in the composition.

Another feature is a semiconductor dielectric modified by a ferroelectric system, the latter being compensated by a metal stannate to control selectively the combined dielectric and resistivity.

Another feature is a method of fabricating a semiconductor-ferroelectric dielectric to have good resistivity and a dielectric constant by sintering the ferroelectric in a reducing atmosphere prior to combination with the semiconductor.

Another feature is a method of fabricating a reactive element, typically a decoupling capacitor, having a semiconductor-ferroelectric dielectric.

The foregoing and other objects, features and advantages of the invention will be apparent from the following more particular description of the preferred embodiments of the invention as illustrated in the accompanying drawings.

In the drawings:

FIGURE 1 is a flow chart indicating the steps for fabricating the dielectric of the present invention.

FIGURE 2 is a cross-sectional view of a capacitor employing a dielectric of the present invention.

FIGURE 3 is a table of ranges of semiconductor and ferroelectric materials in the dielectric of the present invention.

FIGURE 4 is a table of semiconductor-ferroelectric compositions, the latter modified by various percentages of metal stannate to control selectively the dielectric constants and resistivity thereof.

Figure 3A:
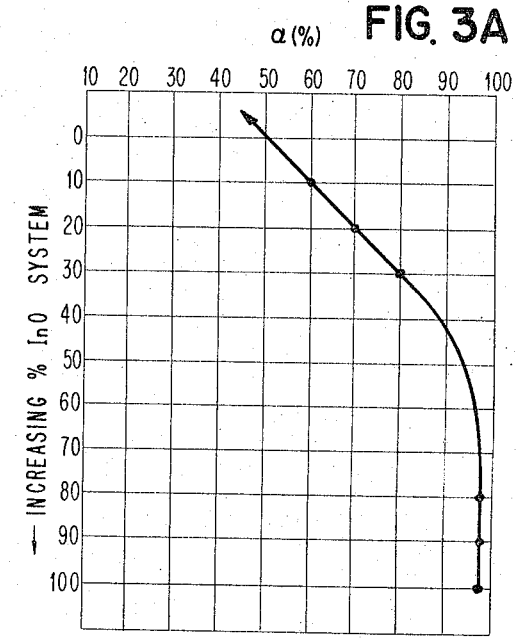
FIGURE 3A is a linear graph of damping characteristics (percent) versus semiconductor percentages in the dielectric of the present invention.

A semiconductor material having a desired dielectric constant of the order of 1000 can be obtained from a sintered mixture of N and P type semiconductor oxide material. Particular materials having the desired dielectric constant include, at least, a combination of zinc oxide (ZNO) and bismuth trioxide ($Bi_2O_3$). Also, the combination of zinc oxide and lead oxide. In these combinations, the zinc oxide is an N semiconductor and the lead oxide (PbO) and bismuth trioxide are P-type semiconductors. Other P-type semiconductors that may be employed include cupric oxide (CuO) and cuprous oxide ($Cu_2O$) and nickel oxide (NiO). Other N semiconductor materials include cadmium oxide (CdO), aluminum oxide ($AlO_2$) and stannous oxide ($SnO_2$).

Referring to FIG. 1, the selected oxide semiconductor materials, typically zinc oxide, in an operation 20, are weighed and placed in a mortar and pestle in their respective proportions by weight as required. A small percentage of a monovalent dopant either silver, lithium or copper, as a very small percentage by weight, is added to the semiconductor powder to increase the resistivity thereof. In one form, 96% by weight of zinc oxide, 3% by weight bismuth trioxide and 1 mol. percent of copper titanate ($CuTiO_3$) were combined. The semiconductor and dopant powder were very high grade quality and purchased from commercial suppliers. The powders were dry-mixed for 2 hours. Specific details relative to the preparation of the semiconductor powder are described in the previously filed applications, IBM Docket 14,076, Ser. No. 360,323, and IBM Docket 14,156, Ser. No. 465,329, now U.S. Patent No. 3,264,537, referred to hereinbefore.

The ferroelectric materials are prepared by a first step 22 which weighs and mixes a ferroelectric material and a suppressor which renders the ferroelectric relatively insensitive to temperature in addition to controlling selectively the dielectric constant. One technique for rendering the ferroelectric relatively temperature insensitive is described in a previously filed application, IBM Docket 14,095, Ser. No. 378,863, filed June 29, 1964 and assigned to the assignee of the present invention. Another technique for rendering the ferroelectric temperature insensitive is the addition of a metal stannate as a suppressor. The metal stannate, when properly combined with the ferroelectric, permits the latter to retain a polarization independent of temperature for particular reasons indicated hereinafter.

Ferroelectrics that have been found practical in the present invention include barium titanate and strontium titanate. Metal stannates which have been found practical include lead stannate, calcium stannate and bismuth stannate. In one form, 87% by weight of barium titanate and 13 weight percent lead stannate were mixed and dried for two hours in an operation 22. The titanate and stannate were high grade quality purchased from commercial suppliers. The mixed powder was formed into a slurry, as operation 24, and dispersed to dry. The vehicle added to the powder was water. A powder residue remained after drying. The powder residue was placed in a suitable container and calcined in an operation 26. Calcining occurred at 1000° C. for two hours on a zirconia plate. The calcined powder, in an operation 28, was crushed. The residue may then be optionally pressed into pellets under 20,000 pounds per square inch (p.s.i.). The crushing is done with a mortar and pestle. The pellets or aggregate are then sintered in an operation 30, at 1425° C. for two hours on a zinconia plate. The sintered pellets or aggregate, in an operation 32, were crushed and blended into a trichlor or tetrachlor slurry. The particle size of the slurry was reduced to less than 0.8 mil by grinding in a ball mill. The ground pellets were dried prior to an optional reducing operation 34. Laboratory experience indicated the reduction operation 34 slightly increased the dielectric constant of the final material due to particle composition. The reduction was done at 900° C. for one hour in a forming gas or like atmosphere.

The complete dielectric was prepared by combining the semiconductor powder, described in operation 20, with the powder resulting from the operation 32 or 34. In one form, 80% by weight of a semiconductor powder and 20% by weight of a modified ferroelectric were combined, in an operation 36. The powders were intimately mixed in the dry state and uniformly blended with a suitable vehicle until a paste was formed. The vehicle was added in such quantities that the size contents of the paste was approximately 70%. One vehicle was a combination of beta-terpineol and ethyl cellulose, the former being approximately 90% of the vehicle.

A thin film decoupling capacitor was fabricated on a dielectric substrate, typically alumina or the like, by a series of screening steps. As a first operation 38, a metal electrode was placed on the substrate. In one form, a gold-platinum-glass flux paste composition, described in a previously filed application, IBM Docket 14,076, Ser. No. 360,323, assigned to the same assignee as that of the present invention, was suitably silk screened onto the substrate. The screened metal was fired at an elevated temperature. The particular temperature, generally, depends upon the melting point of the flux, but is generally of the order of 750° C. The dielectric material, resulting from the operation 36, was applied over the electrode. The dielectric layer was preferably applied in two sub-layers. The screened dielectric was dried at 150° C. for 20 minutes, followed by firing at 1000° C. for ten minutes. After quenching, a second layer was applied over the first layer and dried at 150° C. for 20 minutes. A second metal electrode, of the composition indicated previously, was screened over the composite dielectric layer in an operation 42. The preparation of an electrode material was the same as that described in connection with the operation 38. The dielectric from the operation 36 was also screened over the top metal electrode by operation 43. The external dielectric served to provide for the top electrode similar to that for the bottom electrode. A firing operation 44 was performed to complete the capacitor fabrication. The firing was performed in a suitable furnace at 1000° C. for 20 minutes. In the case of a reduced ferroelectric, firing occurred for 20 minutes, whereas 40 minutes were required for an unreduced ferroelectric. The completed capacitor was quenched by a stream of coolant gas. Measurements relating to capacitance, resistance, frequency response, damping and dissipation were performed with conventional instrumentation. Damping measurements are described in IBM Technical Report TR 22.123 by R. A. Delaney, dated May 4, 1965.

Referring to FIG. 2, a film capacitor 50, resulting from the process of FIG. 1, is shown secured to a substrate 52, typically alumina or the like. A first electrode 54 of a gold-platinum composition is deposited on the substrate. The dielectric 56 of the invention is deposited on the metal electrode 54. A second electrode 58 is deposited on the dielectric and also makes contact with the stubstrate. A final dielectric 60 is deposited over the electrode. It it understood a plurality of film electrodes and dielectrics may be sandwiched together. The dimensions of the respective electrodes and dielectrics as employed in a microelectronic module, may be as small as 50 mils on a side and the thickness of a dielectric may be as small as 10 microns.

The following examples are included to aid the understanding and appreciation of the invention. Variations in the materials and quantities may be made by one skilled in the art without departing from the spirit of the invention.

*Examples 1 through 8*

Turning to FIG. 3, the semiconductor and ferroelectric composition was prepared in the manner described in connection with FIG. 1. Briefly, the zinc oxide (96%), bismuth trioxide (3%) and a copper titanate dopant (1%), parts by weight, were weighed and mixed for a two-hour period. Likewise, a barium titanate (87%) and bismuth stannate (13%), parts by weight, ferroelectric were weighed, mixed, calcined and sintered at 1425° C. for two hours. The sintered ferroelectric was blended into a slurry and ground in a ball mill until the agglomerate particle size was less than 0.8 mil. After drying, the ferroelectric powder was mixed with the semiconductor powder in the various percentages indicated in FIG. 3. A paste was formed with 30% by weight of a vehicle which included 94% beta-terpineol and 6% ethyl cellulose. A series of 96% alumina substrate were thoroughly cleaned and dried. Bottom electrodes of a gold-platinum paste composition were screened onto the substrate in a desired electrode pattern. The screened electrode was dried and fired at 760° C for 20 minutes to produce a fused gold-platinum electrode. The dielectric layer was made by successive applications of two sub-layers. The dielectric paste was screened over the fused electrodes, dried at 150° C. for 15 minutes, fired at 1000° C. for ten minutes and quenched by a stream of coolant gas. A second sub-layer of the same dielectric composition was screened over the first layer and dried at 150° C. for 15 minutes. A top electrode of the same gold-platinum composition described for the first electrode was silk screened over the composite dielectric layer and dried at 150° C. for 15 minutes. An external dielectric was screened over the top electrode.

Figure 3B:
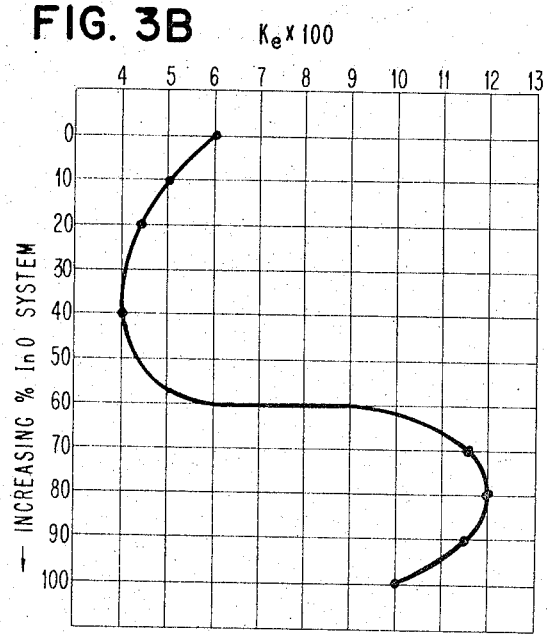
FIGURE 3B is a linear graph of dielectric constant versus semiconductor percentages in the dielectric of the present invention.
Figure 3C:
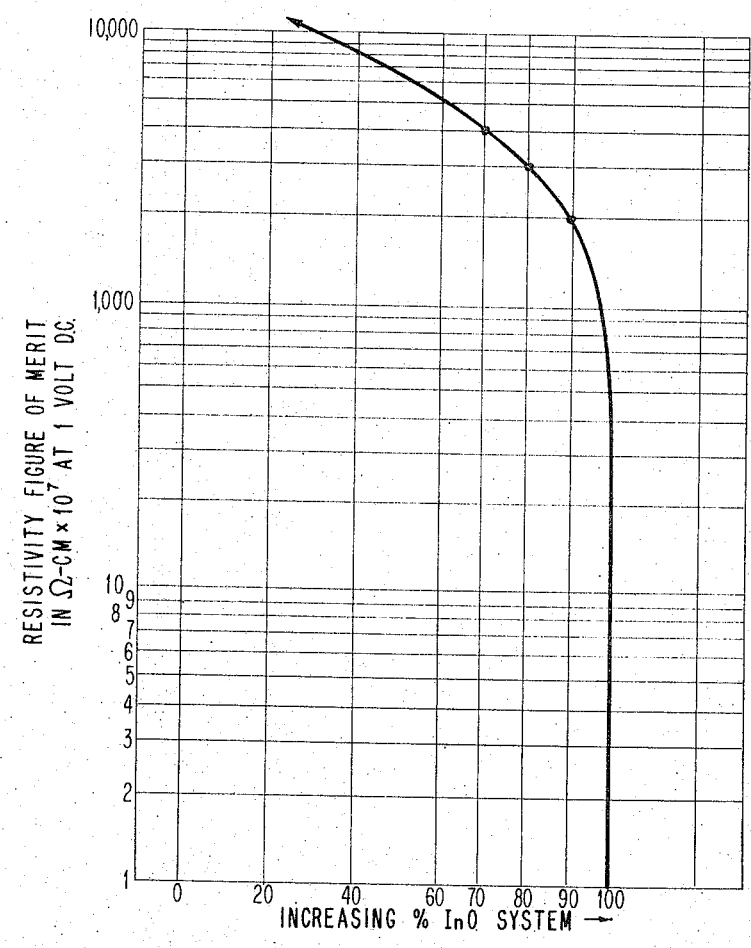
FIGURE 3C is a semi-logarithmic graph of resistivity (ohm centimeters) versus semiconductor percentages in the dielectric of the present invention.

FIGS. 3A and 3B indicate the change in the damping factor (alpha) and dielectric constant for changes in semiconductor compositions. FIG. 3A indicates that as the zinc oxide is reduced below 70% the damping factor is substantially altered. Similarly, FIG. 3B indicates that as the semiconductor is increased beyond 90% the dielectric constant falls off by approximately 20%. Additionally, the resistivity of the composition is significantly reduced, as indicated by FIG. 3C. A decoupling capacitor, based on the reduced resistivity, will be required to operate at a lower voltage.

Accordingly, FIGS. 3, 3A and 3B indicate that a semiconductor-ferroelectric composition in the range of 90%–70% semiconductor and 10–30% ferroelectric provides the desired dielectric and resistivity characteristics necessary for a decoupling capacitor in miroelectronic circuits. The preferred or optimum magnitudes of semiconductor and ferroelectric are 80% and 20%, respectively.

*Examples 9 through 16*

The procedure for the preparation of the dielectric composition and the fabrication of a capacitor device for this group of examples was identical to Examples 1 through 8 description. However, the suppressor was changed. The resulting modified ferroelectric was combined with the semiconductor in a reduced form and in an unreduced form, as shown in FIG. 4. Standard tests were again run on this series of capacitors with the results as indicated in FIG. 4.

The suppressor modifies the ferroelectric curie point peak such that the dielectric constant versus temperature curve has a slope substantially zero. The basis for this phenomena is described in an article entitled "Dielectric Bodies in Metal Stannate-Barium Titanate Binary Systems" by William W. Coffeen, Journal of American Ceramic Society, Vol. 37, No. 10, October 1964, pp. 480–489

In suppressing the ferroelectric curie point, the metal stannates are able to control selectively the dielectric constants and resistivities of the various semiconductor-ferroelectric compositions. Referring to FIG. 4, a dielectric constant, for Examples 11 through 16, varies from 1100 to 1800. Damping factor, which is 98 percent, however, is the same for all examples. It will also be noted that the dielectric constant of the present composition is greater than that for the semiconductor (900–1100) and the ferroelectric (800–1000). It is further to be noted that these resistivity values will in general be in the same ratios to one another but have different values at different voltage biases in accordance with the usual semiconductor voltage-current relationship.

Accordingly, the present invention has provided a semiconductor-ferroelectric dielectric useful in a decoupling capacitor, the capacitor having improved resistivity, good dielectric constant and high damping.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A composition comprising about 10% to 30% by weight of discrete suppressor modified ferroelectric material with means to modify said ferroelectric and being devoid of semiconductor properties, and about 70% to 90% by weight of discrete semiconductor material devoid of ferroelectric properties.

2. A composition comprising: about 10% to 30% by weight of discrete ferroelectric material with means to modify said ferroelectric and being devoid of semiconductor properties, about 70% to 90% by weight of discrete semiconductor material devoid of ferroelectric properties and a metal stannate comprising about 13% by weight of the said ferroelectric material with said semiconductor material comprising the combination of an N-type semiconductor and a P-type semiconductor material.

3. A composition comprising:
a uniformly dispersed sintered mixture of about 80% by weight semiconductor material and about 20% by weight ferroelectric material;
said semiconductor material being composed of at least about 97% of N-type semiconductor material from the group consisting of zinc oxide, cadmium oxide, aluminum oxide and stannous oxide and 3% P-type semiconductor from the group consisting of bismuth trioxide, lead oxide, cupric oxide, cuprous oxide and nickel oxide;
said ferroelectric material being composed of a material from the group consisting of barium titanate and strontium titanate, and a metal stannate from the group consisting of calcium stannate, lead stannate and bismuth stannate;
the metal stannate being about 13% by weight of the ferroelectric.

4. An electric device comprising:
a pair of electrodes;
a dielectric body between said pair of electrodes;
said dielectric body being composed of a mixture of about 70% to 90% by weight semiconductor devoid of ferroelectric properties and about 30% to 10% by weight ferroelectric with means to modify said ferroelectric and being devoid of semiconductor properties.

5. An electrical device comprising: a pair of electrodes; a dielectric body between said pair of electrodes, with said dielectric body being composed of a mixture of about 70% to 90% by weight semiconductor, and about 30% to 10% by weight ferroelectric, and wherein the semiconductor comprises a sintered uniform mixture of finely divided particles of about at least 97% by weight N-type semiconductor from the group consisting of zinc oxide, cadmium oxide, aluminum oxide and stannous oxide and about 3% by weight P-type semiconductor from the group consisting of bismuth trioxide, lead oxide, cupric oxide, cuprous oxide and nickel oxide.

6. An electrical device comprising: a pair of electrodes; and a dielectric body between said pair of electrodes, with said dielectric body being composed of a mixture of about 70% to 90% by weight, semiconductor and about 30% to 10% by weight ferroelectric, and wherein the ferroelectric is composed of a uniform mixture of about at least 87% by weight barium titanate and about 13% by weight a metal stannate from the group consisting of calcium stannate, lead stannate and bismuth stannate.

7. An electric device comprising:
a ceramic substrate;
a first electrode adhered to the substrate;
a dielectric body covering said first electrode;
said dielectric body being composed of about at least 80% weight semiconductor devoid of ferroelectric properties and about 20% by weight ferroelectric with means to modify said ferroelectric and being devoid of semiconductor properties with said semiconductor comprising an N-type semiconductor material and a P-type semiconductor material; and
a second electrode adhered to said dielectric.

8. The electric device of claim 7 further including a dielectric body covering the second electrode.

9. An electric device comprising:
a ceramic substrate;
a first electrode adhered to the substrate;
a dielectric body covering said first electrode;
said dielectric body being composed of about at least 80% by weight semiconductor and about 20% by weight ferroelectric with said semiconductor comprising an N-type semiconductor material and a P-type semiconductor material; and
wherein the said ferroelectric includes about 13% by weight metal stannate from the group consisting of lead stannate and bismuth stannate;
and wherein said ferroelectric is selected from the group consisting of barium titanate and strontium titanate.

10. The composition of claim 1 wherein said semiconductor material comprises an N-type semiconductor material and a P-type semiconductor material.

11. The composition of claim 1 wherein said semiconductor material comprises a major amount of an N-type semiconductor material and a minor amount of a P-type semiconductor material.

12. The composition of claim 1 wherein said semiconductor material comprises at least 94% of an N-type semiconductor oxide and not more than 6% of a P-type semiconductor oxide.

References Cited

UNITED STATES PATENTS

| | | | |
|---|---|---|---|
| 2,852,400 | 9/1958 | Remeika | 106—39 |
| 2,759,854 | 8/1956 | Kilby | 317—261 X |
| 3,080,239 | 3/1963 | Zlotnick | 106—39 |
| 3,231,799 | 1/1966 | Prokopowicz | 317—258 |
| 3,232,856 | 2/1966 | Klach | 317—258 X |

LEWIS H. MYERS, *Primary Examiner.*

E. GOLDBERG, *Assistant Examiner.*